United States Patent
Hanatani et al.

(10) Patent No.: US 10,440,523 B2
(45) Date of Patent: Oct. 8, 2019

(54) COMMUNICATION CONTROL DEVICE, COMMUNICATION DEVICE, AND COMPUTER PROGRAM PRODUCT FOR MANAGING A GROUP OF DEVICES

(71) Applicant: Kabushiki Kaisha Toshiba, Minato-ku (JP)

(72) Inventors: Yoshikazu Hanatani, Kawasaki (JP); Toru Kambayashi, Chigasaki (JP); Fangming Zhao, Fuchu (JP); Yoshihiro Oba, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 598 days.

(21) Appl. No.: 14/672,287

(22) Filed: Mar. 30, 2015

(65) Prior Publication Data

US 2015/0208210 A1 Jul. 23, 2015

Related U.S. Application Data (63) Continuation of application No. PCT/JP2013/066537, filed on Jun. 11, 2013.

(30) Foreign Application Priority Data

Nov. 2, 2012 (JP) ................................. 2012-243072

(51) Int. Cl.
*H04L 29/06* (2006.01)
*H04W 4/08* (2009.01)
*H04L 9/08* (2006.01)

(52) U.S. Cl.
CPC ............. *H04W 4/08* (2013.01); *H04L 9/0833* (2013.01); *H04L 9/0836* (2013.01)

(58) Field of Classification Search
None
See application file for complete search history.

(56) References Cited

U.S. PATENT DOCUMENTS 6,735,313 B1 * 5/2004 Bleichenbacher ..... H04H 60/23
 348/E7.056
8,929,541 B2 1/2015 Kambayashi et al.
 (Continued)

FOREIGN PATENT DOCUMENTS

JP 2001-358705 A 12/2001
JP 2005-4263 A 1/2005
JP 5670272 B2 12/2014

OTHER PUBLICATIONS

International Search Report dated Mar. 20, 2014 for PCT/JP2013/066537 Filed on Jun. 11, 2013 (English Language).
(Continued)

*Primary Examiner* — Jeffery L Williams
(74) *Attorney, Agent, or Firm* — Oblon, McClelland, Maier & Neustadt, L.L.P.

(57) ABSTRACT

A communication control device includes an extracting and an output unit. One or more communication devices belong to a first-type group, and one or more communication devices belong to a second-type group. From a media key block containing a plurality of elements, the extracting unit extracts partial information containing an element which is processible by each communication device belonging to a subset of the second-type group. To the communication devices belonging to the second-type group that is identified by identification information corresponding to the partial information; the output unit outputs a group ID that indicates the first-type group, the identification information, and the partial information.

10 Claims, 7 Drawing Sheets

(56) References Cited

U.S. PATENT DOCUMENTS

| | | | |
|---|---|---|---|
| 2003/0142824 A1* | 7/2003 | Asano | G06F 21/10 380/277 |
| 2005/0229257 A1 | 10/2005 | Kim et al. | |
| 2007/0033419 A1* | 2/2007 | Kocher | G06F 21/10 713/193 |
| 2007/0044159 A1* | 2/2007 | Ishiguro | G06F 21/10 726/27 |
| 2007/0053513 A1* | 3/2007 | Hoffberg | G06K 9/00369 380/201 |
| 2007/0186110 A1* | 8/2007 | Takashima | H04L 9/0836 713/173 |
| 2007/0263875 A1 | 11/2007 | Kitaya et al. | |
| 2007/0289025 A1* | 12/2007 | Tanaka | G06F 21/10 726/28 |
| 2010/0332849 A1* | 12/2010 | Takashima | H04L 9/0836 713/189 |
| 2011/0255690 A1* | 10/2011 | Kocher | G06F 21/10 380/210 |
| 2012/0198229 A1* | 8/2012 | Takashima | H04L 9/0836 713/156 |
| 2012/0250867 A1 | 10/2012 | Kambayashi | |
| 2013/0259227 A1 | 10/2013 | Hanatani | |
| 2014/0173283 A1 | 6/2014 | Hanatani | |
| 2015/0086010 A1 | 3/2015 | Kambayashi et al. | |

OTHER PUBLICATIONS

International Written Opinion dated Mar. 20, 2014 for PCT/JP2013/066537 Filed on Jun. 11, 2013 (English Language).

Wen Tao Zhu, "A Cost-Efficient Secure Multimedia Proxy System", IEEE Transactions on Multimedia, vol. 10, No. 6, Oct. 1, 2008, pp. 1214-1220.

Jeffrey B. Lotspiech, ED—Alireza Seyedi et al., "A Signature-Like Primitive for Broadcast-Encryption-Based Systems", Consumer Communications and Networking Conference, 2007, CCNC 2007, Jan. 1, 2007, pp. 1042-1047.

Fangming Zhao et al., "Secure Authenticated Key Exchange with Revocation for Smart Grid", Innovative Smart Grid Technologies (ISGT), Jan. 16, 2012, pp. 1-8.

M. Baugher et al., "The Group Domain of Interpretation", Jul. 2003, pp. 1-48.

* cited by examiner

COMMUNICATION CONTROL DEVICE, COMMUNICATION DEVICE, AND COMPUTER PROGRAM PRODUCT FOR MANAGING A GROUP OF DEVICES

CROSS-REFERENCE TO RELATED APPLICATION

This application is a continuation of International Application No. PCT/JP2013/066537, filed on Jun. 11, 2013, which claims the benefit of priority from Japanese Patent Application No. 2012-243072, filed on Nov. 2, 2012; the entire contents of which are incorporated herein by reference.

FIELD

Embodiments described herein relate generally to a communication control device, a communication device, and a computer program product.

BACKGROUND

In order to perform efficient management of a number of devices that are connected to a network; methods are known in which the devices are managed in groups. Such methods of managing devices in groups include a static group management method, in which a predetermined group structure is used, and a dynamic group management method, in which groups are generated and deleted depending on the situation.

Non-patent Literature 1: M. Baugher et al., "RFC 3547, The Group Domain of Interpretation", [online], July 2003, retrieved from the Internet: <URL: http://www.ietf.org/rfc/rfc3547.txt>

In the dynamic group management method, although flexible management can be performed depending on the situation, ensuring scalability remains an issue.

DETAILED DESCRIPTION

According to an embodiment, a communication control device includes an extracting and an output unit. One or more communication devices belong to a first-type group, and one or more communication devices belong to a second-type group. From a media key block containing a plurality of elements, the extracting unit extracts partial information containing an element which is processible by each communication device belonging to the second-type group. To the communication devices belonging to a subset of the second-type group that is identified by identification information corresponding to the partial information; the output unit outputs a group ID that indicates the first-type group, the identification information, and the partial information.

Exemplary embodiments of a communication control device according the present invention will be described below in detail with reference to the accompanying drawings.

GDOI (the Group Domain of Interpretation) is a technology that makes use of multicasting so as to enable participation and withdrawal of group members as well as to enable secure distribution of group keys. In the GDOI, it is possible to perform group creation, group updating, and group key distribution. However, in the GDOI, every time a group member is updated, the key information (LKH_DOWNLOAD_ARRAY) that has a hierarchical structure gets updated in almost all members. For that reason, in the case when a single communication device belongs to a plurality of groups, it becomes necessary for that single communication device to hold a plurality of pieces of key information LKH_DOWNLOAD_ARRAY. In other words, a number of the key information LKH_DOWNLOAD_ARRAY that a single communication device holds depends on a number of groups to which the single communication device is belonged. As a result, efficient management becomes a difficult task to perform.

In that regard, in the present embodiment; group operations are performed with the use of a technology called an MKB (Media Key Block). By using an MKB, the affiliation to a plurality of groups can be efficiently managed with a single device key (a key ring equivalent to the key information LKH_DOWNLOAD_ARRAY). A number a device key that a single communication device holds does not depend on a number of groups to which the single communication device is belonged.

An MKB is data from which a media key for decoding contents, which are stored in media, can be derived by performing processing using the corresponding device key. An MKB contains one or more elements. A typical MKB contains one or more ciphertexts (elements) each of which is generated by encoding a single media key using one or more device keys. Moreover, an MKB can also contain information that enables identification of the device keys that are used in processing ciphertexts. In an MKB, the number of ciphertexts is determined depending on the corresponding device keys. Hence, depending on the corresponding device keys, there are cases when an MKB contains an enormous number of ciphertexts as elements.

In the present embodiment, a media key that is obtained by processing an MKB is used as a group key which is shared among one or more communication devices belonging to a particular group. Thus, by distributing an MKB from which a group key of a particular group can be derived if processing is done using the device keys that are held by the communication devices belonging to the particular group, it becomes possible to distribute the group key only to those communication devices which belong to the particular group. This fact can be put to use to perform group management of communication devices.

In the present embodiment, in the case of performing group management (group operations) using a particular MKB, the control is performed in such a way that a device that was able to process the MKB and retrieve a group key belongs to the group corresponding to the retrieved group key (if that device is not currently belonging to the group, then it newly participates in the group). On the other hand, the control is performed in such a way that a device that fails to retrieve a group key does not belong to the group corresponding to the retrieved group key (if that device is currently belonging to the group, then it withdraws itself from the group).

However, if the number of target devices is enormous, then there is a possibility that the MKB used for the purpose of group operations grows to a substantially large size. If such an MKB is distributed without modification over a communication network, then there is a possibility that the communication load becomes very large.

In that regard, in the present embodiment, in order to lower the network load, an MKB containing a plurality of ciphertexts as elements is divided and sent in portions. However, if it is assumed that the group control method as described above is to be implemented; then dividing and sending an MKB simply on the basis of ciphertexts may at times be insufficient to perform the intended group control. For example, if a communication device receives an MKB that has been divided in portions but is not able to retrieve the group key from that MKB; then that communication device withdraws itself from the corresponding group. However, in practice, there is a possibility that an MKB from which the communication device is able to retrieve the group key reaches at a later timing.

In order to avoid such a problem, appended to a particular MKB is the information that specifies a set of target communication devices for performing group operations using that MKB. For example, as the information that specifies a set of communication devices, it is possible to use identification information that enables identification of multicast groups (for example, information such as multicast group IDs and multicast addresses). A multicast group is an example of a group (a second-type group) that is managed independent of other groups (first-type groups) which are subjected to group operations using MKBs. The following explanation is given for an example in which a second-type group is used as a multicast group. However, it is not that only the second-type group that can be used as a multicast group. That is, any other group that is managed independent of the first-type groups can be used as a multicast group. When a communication device receives an MKB to which is appended the information specifying a set of communication devices, the communication device operations as indicated by a pseudo-code given below.

```
if (belonging to a second-type group){
    process the MKB;
    if (the group key is successfully retrieved){
        if (currently belonging to a first-type group){
            update the first-type group;
        }
        else{
            if (currently not belonging to the first-type group){
                participate in the first-type group;
            }
        }
    }
    else{
        if (currently belonging to a first-type group){
            withdraw from the first-type group;
        }
    }
}
```

The communication device checks if it is included in a specified set. If included in the specified set, the communication device makes use of the device key held therein and processes the MKB. If the communication device not only successfully retrieves the group key but is also participating in a first-type group, then the communication device updates the information of the first-type group using the derived group key. In contrast, if the communication device successfully retrieves the group key but is not participating in the first-type group, then the communication device participates in the first-type group using the derived group key. Meanwhile, if the communication device fails to retrieve the group key but is participating in the first-type group, then the communication device withdraws itself from the first-type group.

In this way, in the present embodiment, a communication device first checks whether it itself is a target communication device for group operations. If the communication device is not a target communication device for group operations, then the group operations are not performed. As a result, even when an MKB that has been divided in portions is used, it becomes possible to avoid unintended group withdrawal operations.

Figure 1:
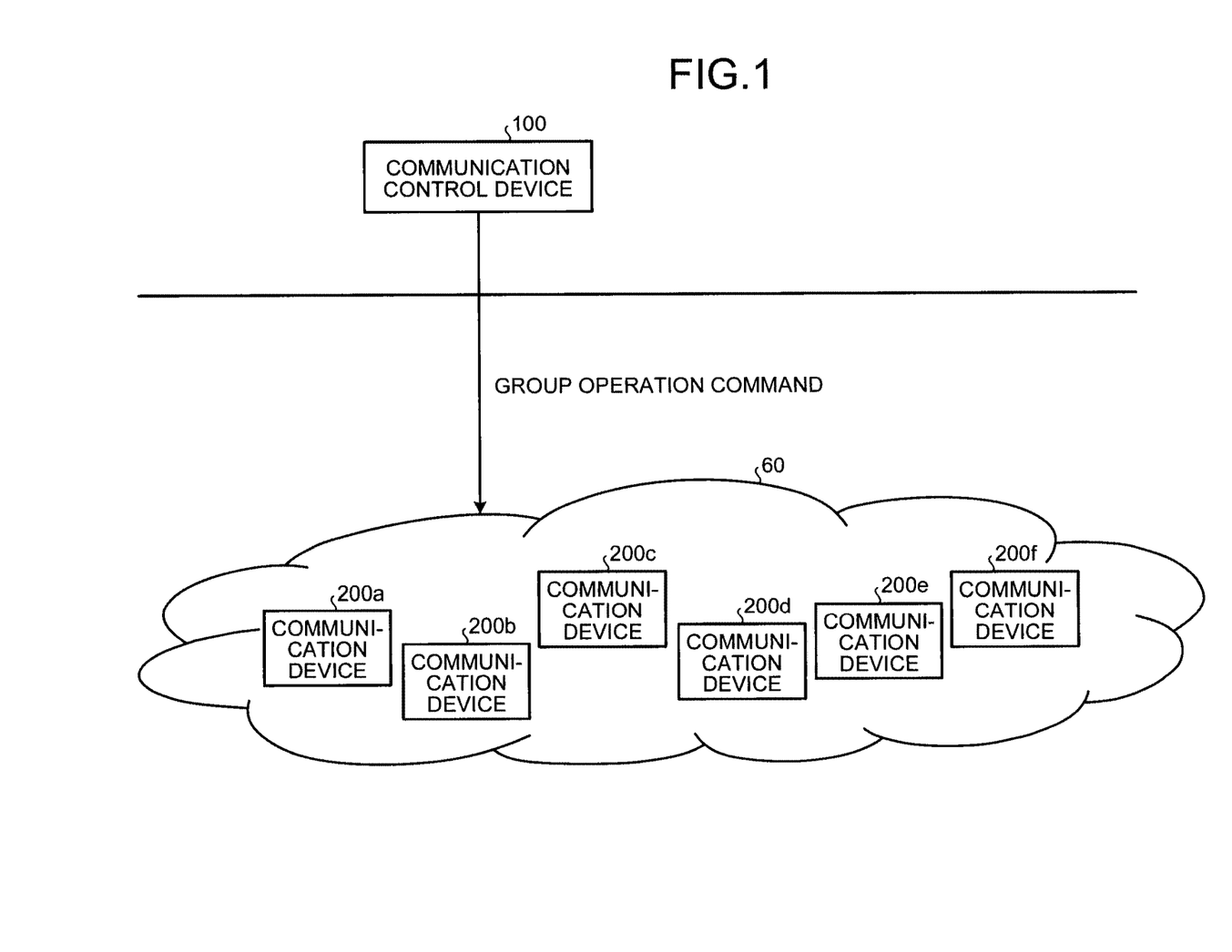
FIG. 1 is a block diagram illustrating a communication system according to an embodiment.

Given below is the explanation regarding the details of the present embodiment. FIG. 1 is a block diagram illustrating an exemplary configuration of a communication system according to the present embodiment. As illustrated in FIG. 1, in the communication system according to the present embodiment, communication devices 200a to 200f are connected to a communication control device 100 via a network 60. Herein, as the network 60, it is possible to implement any network form such as the Internet. Each of the communication devices 200a to 200f need not be directly connected to the communication control device 100.

The configuration is not limited to include only a single communication control device 100. That is, it is possible to have a configuration including two or more communication control devices. Since the communication devices 200a to 200f have an identical configuration, sometimes they are simply referred to as communication devices 200. Moreover, the number of communication devices 200 is not limited to six.

As illustrated in FIG. 1, in the present embodiment, the communication control device 100 sends a group operation command to each communication device 200. The group operation command contains, for example, a group ID that enables identification of an updated group; identification information that enables identification of a multicast group; and partial information that is obtained by dividing an MKB in portions.

Figure 2:
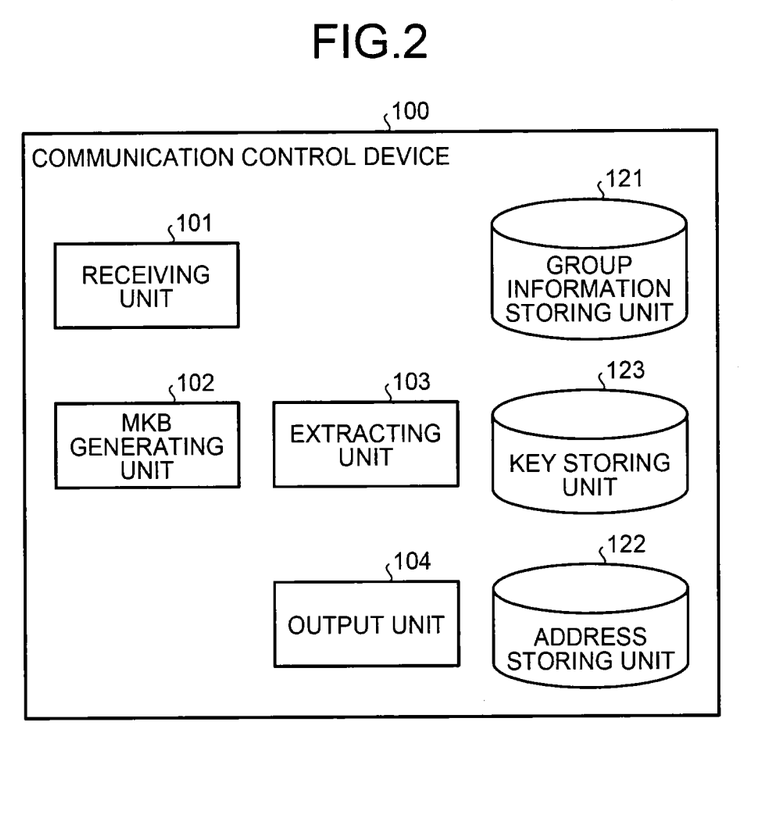
FIG. 2 is a block diagram illustrating a communication control device according to the embodiment.

FIG. 2 is a block diagram illustrating a configuration example of the communication control device 100. As illustrated in FIG. 2, the communication control device 100 includes a group information storing unit 121 (a second storing unit), an address storing unit 122 (a first storing unit), a key storing unit 123 (a third storing unit), a receiving unit 101, an MKB generating unit 102, an extracting unit 103, and an output unit 104.

The group information storing unit 121 is used to store group information that contains group IDs of such groups to which belong one or more communication devices 200 and contains device IDs that enable identification of the communication devices 200 which belong to the groups identified by the group IDs. Thus, in the group information storing unit 121, a group ID is stored in a corresponding manner to the device ID of each of one or more communication devices 200 which belong to the group identified by that group ID.

In the present embodiment, it is assumed that the group information storing unit 121 is used to store, in advance, one or more group IDs. However, alternatively, instead of disposing the group information storing unit 121, it is possible to perform group operations on the basis of group information received from an external device.

In the address storing unit 122, the identification information that enables identification of multicast groups to each of which belong one or more communication devices 200 (i.e., information such as multicast group IDs and multicast addresses) is stored in a corresponding manner to the device IDs of the communication devices 200 that belong to each multicast group. A multicast address is used, for example, to send information to the communication devices 200 having the corresponding device IDs by means of multicast communication. In the case of not using multicast communication (for example, in the case of using broadband communication), the configuration can be done without disposing the address storing unit 122.

In the present embodiment, it is assumed that the address storing unit 122 is used to store, in advance, one or more pieces of identification information. Alternatively, the configuration can be such that new information is added to the address storing unit 122 or the already-stored information is updated on the basis of information received from an external device.

The key storing unit 123 is used to store the device keys that are assigned to the communication devices 200. In the case when an MKB is generated by means of the CS (Complete Subtree) method (described later), the key storing unit 123 can be configured to store the device keys in a corresponding manner to the nodes of a graph structure (such as a tree structure).

The receiving unit 101 receives a variety of information from an external device such as the communication device 200. For example, the receiving unit 101 receives a group control request and information in which the target for group control is specified. Herein, a group control request points to a request for creating a new group or a request for modifying a group (a request for changing the communication devices 200 belonging to a particular group). For example, the configuration can be such that, from the input performed by an operator using an operating unit (not illustrated) such as a keyboard, the receiving unit 101 receives the group ID of the target group for operations and receives the device IDs of the communication devices 200 that are to be included in that target group for operations. Meanwhile, group control can be performed not only in the case when a group control request is received from an external device but also in the case when the communication control device 100 determines that it is necessary to perform group control. The receiving unit 101 sends the information (input information), in which a group control request and the target for group control is specified, to the MKB generating unit 102.

The MKB generating unit 102 generates an MKB on the basis of the group control request and the information in which the target for group control is specified. The generated MKB is then used in performing group control. For example, if input information is received in which updating of a group is specified, then the MKB generating unit 102 updates the group information in the group information storing unit 121 according to the input information. Once a group is updated, the MKB generating unit 102 makes use of the device keys of the communication devices 200 that belong to the updated group, so as to generate an MKB from which the group key of the updated group can be derived by only the communication devices 200 belonging to the updated group.

For example, the MKB generating unit 102 receives input of a list of device keys, which contains the device keys held in the communication devices 200 belonging to a group, and also receives input of the corresponding group key. Then, from the list of device keys and the group key, the MKB generating unit 102 generates an MKB from which the group key can be retrieved by only those communication devices which hold a device key specified in the list of device keys. As methods of generating an MKB, there are known methods such as the CS method, the SD (Subset Difference) method, and the LKH (Logical Key Hierarchy) method. Herein, it is possible to implement any one of those methods.

The MKB generating unit 102 ensures that the modification in the group information is reflected in the group information storing unit 121. Herein, the modification in the group information points to new addition of a group ID and new addition of a list of device IDs; deletion of a group ID and deletion of a list of device IDs, and updating of the list of device IDs corresponding to a particular group ID.

For each piece of identification information that is stored in the address storing unit 122; the extracting unit 103 extracts, from an MKB, pieces of partial information each of which contains elements that can be processed using the device keys of the communication devices 200 which belong to the groups (multicast groups) specified in the identification information. Moreover, the extracting unit 103 generates a group operation message that contains the extracted partial information. Herein, for example, the partial information contains a ciphertext that can be processed using the device keys of the communication devices 200 and contains the information that enables identification of the device keys used in processing that ciphertext. In a single piece of partial information, the number of ciphertexts is not limited to one. That is, a single piece of partial information can contain a plurality of ciphertexts.

Figure 3:
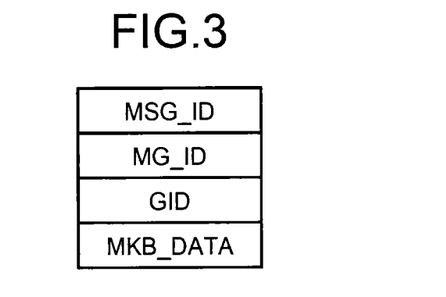
FIG. 3 is a diagram illustrating an exemplary data structure of a group operation message.

FIG. 3 is a diagram illustrating an exemplary data structure of a group operation message. As illustrated in FIG. 3, a group operation message contains MSG_ID, MG_ID, GID, and MKB_DATA. MSG_ID represents the information indicating the type of message. For example, in MSG_ID, a number is recorded which indicates that the message is a group operation message. MG_ID represents the multicast group ID. Thus, MG_ID fills the role of limiting the target communication devices 200 for group operations.

GID represents the group ID of the group that is targeted in the group operation message. MKB_DATA represents the data body of the MKB. In the present embodiment, in MKB_DATA, not the entire MKB generated by the MKB generating unit 102 is set, but the partial information is set that contains some of the elements of the MKB and that is extracted by the extracting unit 103.

Given below is the explanation regarding an example of operations performed by the extracting unit 103. Assume that MKB_t is an MKB that is generated by the MKB generating unit 102. Moreover, an MSG_ID field, a MG_ID field, and an MKB_DATA field of a group operation message (referred to as "msg") are respectively written as msg.MSG_ID, msg.MG_ID, and msg.MKB_DATA.

Given below is an exemplary pseudo-code representing the operations performed by the extracting unit 103.

```
    for (id in [the multicast group ID stored in the address
 storing unit 122]){
    msg.MKB_DATA=φ;
       for (dev_id in [the device IDs stored in the address
 storing unit 122 in a corresponding manner to id]){
          append [the data that is included in MKB_t and that covers
 dev_id] to msg.MKB_DATA;
       //[the data that is included in MKB_t and that covers dev_id]
 can be φ.
       }
    if (msg.MKB_DATA≠φ){
       record the message number appropriate for msg.MSG_ID;
       msg.MG_ID=id;
       in msg.GID, record the target group ID for operations;
       send msg. to the output unit 104;
       }
    }
```

For each MG_ID (id) that is stored in the address storing unit 122, the following operations are performed. Firstly, msg.MKB_DATA is initialized to an empty set. Then, for each device ID (dev_id) that belongs to the multicast group identified by id; the data that is included in MKB_t and that covers the device ID (dev_id) is extracted and is appended to msg.MKB_DATA. If msg.MKB_DATA is not an empty set after performing the abovementioned operation with respect to all device IDs (dev_id) that belong to MG_ID, then an appropriate message number is assigned to msg.MSG_ID; id is assigned to msg.MG_ID; and the target group ID for operations is assigned to msg.GID. Subsequently, to the output unit 104 is sent msg that at least contains (msg.MSG_ID, msg.MG_ID, msg.GID).

As a result of the operations described above, for each multicast group ID that is stored in the address storing unit 122, a single msg is sent to the output unit 104.

In an MKB, for example, the data covering particular device IDs is defined in the following manner. Herein, it is assumed that the MKB is generated by means of the CS method in which, as described in the example given above, device keys are a subset of node keys, which are the encryption keys assigned to the nodes of a binary tree. Herein, different device keys invariably include encryption keys that are assigned to the nodes serving as different leaves. The encryption keys that are assigned to the nodes serving as leaves are called leaf keys.

In the present embodiment, it is assumed that each leaf has a leaf number assigned thereto for the purpose of enabling identification of the leaf. Moreover, the device IDs of the communication devices 200, which are managed by the communication control device 100, are assumed to be the leaf numbers of the leaf keys that are included in the device keys assigned to the communication devices 200. However, such device IDs are only exemplary, and can be assigned independent of the leaf numbers assigned in the binary tree used in the CS method.

If the communication device 200 having a leaf number assigned thereto can process an MKB in a correct manner, then there exists data covering the leaf number. Herein, data covering device IDs points to a ciphertext that is obtained by encoding a group key using a node key, as well as points to an index that indicates a node which is assigned the node key, in order to specify the node key; and a sub binary tree whose root node is indicated by the index contains the nodes to which are assigned leaf numbers, which are the device IDs, as leaves. On the other hand, if the communication device 200 having a leaf number assigned thereto cannot process an MKB in a correct manner; then there exists no data covering the leaf number. In that case, the data covering device IDs is assumed to be an empty set φ. The data covering device IDs corresponds to the partial information containing some of the elements of an MKB.

Thus, when the communication device 200 can process an MKB in a correct manner, it points to the fact that the communication device 200 can derive the group key from that MKB using the device key held in that communication device 200. On the other hand, when the communication device 200 cannot process an MKB in a correct manner, it points to the fact that the communication device 200 cannot derive the group key from that MKB even with the use of every piece of information held in the communication device 200.

Figure 4:
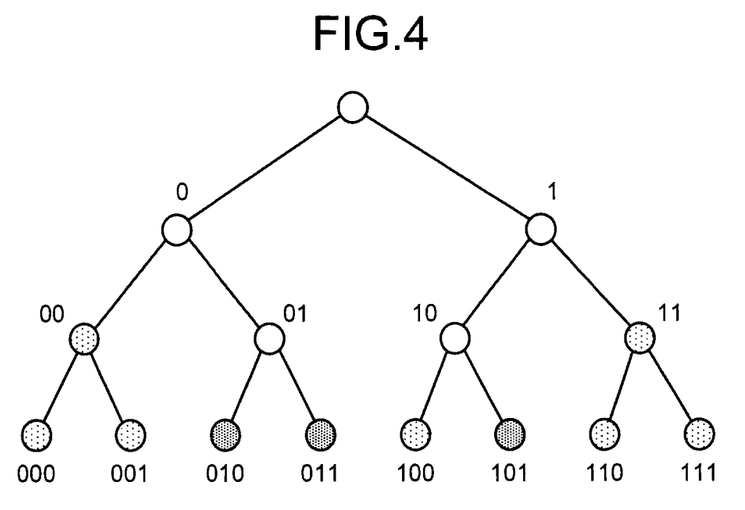
FIG. 4 is a diagram illustrating a specific example in the case of using an MKB generated by means of the CS method.

FIG. 4 is a diagram illustrating a specific example in the case of using an MKB generated by means of the CS method. Herein, a leaf number is represented as a string starting from "0" or "1" and having the string length of three. Regarding the path starting from the root node to a leaf (end node), "0" is assigned in the case of moving leftward and "1" is assigned in the case of moving rightward. As a result, the leaf numbers (from "000" to "111") are obtained. The node indices ("0", "1", "00", "01", "10", and "11") are also assigned in an identical manner. Each node as well as each leaf is assigned with an encryption key. For example, to the node having the index "00" (meanwhile, in the following explanation, the node having an index "n" is also referred to as "node n"), a key k(00) is assigned.

In the example illustrated in FIG. 4, an MKB is provided that has the following three elements that respectively correspond to the node 00, the leaf having the leaf number 100 (meanwhile, in the following explanation, the leaf having a leaf number "m" is also referred to as "leaf m"), and the node 11.

(00, Enc[k(00)](Kg)), (100, Enc[k(100)](Kg)), and (11, Enc[k(11)](Kg)).

Herein, "Kg" represents a group key and "Enc[k(00)](Kg)" represents the data obtained by encrypting the group key "Kg" with "k(00)".

In the communication devices 200 corresponding to the leaves 010, 011, and 101; the abovementioned MKB cannot be processed in a correct manner. That is, even if the device keys or every other piece of information held in the communication devices 200 corresponding to the leaves 010, 011, and 101 are used; the group key "Kg" cannot be derived from the MKB.

In this MKB, the data covering the leaf 000 becomes (00, Enc[k(00)](Kg)). Moreover, since the communication device 200 corresponding to the leaf 011 cannot correctly process the MKB, the data covering the leaf 011 is an empty set φ. In an identical manner, for example, the data covering the node 100 becomes (100, Enc[k(100)](Kg))

Meanwhile, an MKB that is generated by means of a method other than the CS method can also be divided in portions. For example, consider an MKB that is generated by means of the SD method. In an identical manner to the CS method, in the SD method too, the leaf numbers assigned to the communication devices 200 serve as the device IDs. However, in the SD method, the covering condition is different than that in the CS method. That is, in the SD method, if the communication device 200 assigned with a particular leaf number is able to process an MKB in a correct manner, then there exists a pair of nodes (a node and a descendant node thereof) in which the particular leaf number is included in the tree having a particular node as the root node but is not included in the tree having a descendant node of that particular node as the root node. Thus, the data covering device IDs points to a group key that is encrypted using an encryption key assigned to the abovementioned pair of nodes (a node and a descendant node thereof) and points to a pair of indices specifying the nodes included in the pair of nodes.

On the other hand, if the communication device 200 assigned with a particular leaf number is not able to process an MKB in a correct manner, then there exist no nodes of a tree covering that leaf number. That is, regarding a particular leaf number assigned to such a communication device which is not able to process an MKB in a correct manner, either there exists a pair of nodes (a node and a descendant node thereof) in which the particular leaf number is included in the tree having the node as the root node and is also included in the tree having a descendant node of the particular node as the root node; or there exists a node including the particular leaf number but there exists no pair of nodes (a node and a descendant node thereof). In that case, the data covering device IDs is assumed to be an empty set $\phi$.

Figure 5:
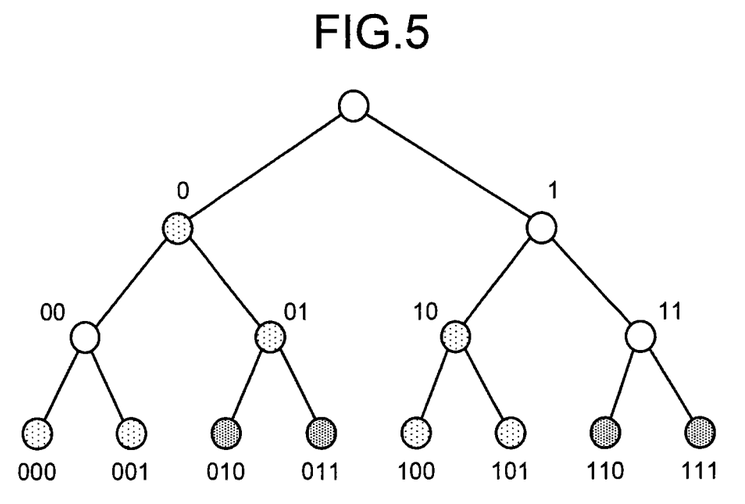
FIG. 5 is a diagram illustrating a specific example in the case of using an MKB generated by means of the SD method.

FIG. 5 is a diagram illustrating a specific example in the case of using an MKB generated by means of the SD method. In an identical manner to the example of using the CS method (FIG. 4), a leaf number is represented as a string starting from "0" or "1" and having the string length of three. Each pair of a node and a descendant node thereof has an encryption key assigned thereto. For example, to the pair of the node 0 and the node 01, a key k(0, 01) is assigned. If all such keys are to be held, it becomes necessary to secure a large memory area. For that reason, with the aim of reducing the memory area, the configuration can be such that the one-way function is applied and only the keys that are used in serially calculating the encryption keys are stored.

In the example illustrated in FIG. 5, an MKB is provided that has the following two elements that respectively correspond to the pair of the node 0 and the node 00 and the pair of the node 10 and the leaf 101.

((0, 01), Enc[k(0, 01)](Kg)) and ((10, 101), Enc[k(10, 101)](Kg))).

Thus, in the communication devices 200 corresponding to the leaves 010, 011, 101, 110, and 111; the abovementioned MKB cannot be processed in a correct manner. At that time, the data covering the leaf 000 becomes ((0, 10), Enc[k(0, 01)] (Kg)). Herein, "Kg" represents a group key and "Enc [k(0, 01)] (Kg)" represents the data obtained by encrypting the group key "Kg" with "k(0, 01)". Moreover, since the communication device 200 corresponding to the leaf 011 cannot correctly process the MKB, the data covering the leaf 011 is an empty set $\phi$. That is, the leaf 011 is assigned with a device key in such a way that it does not hold k(0, 01) or it cannot derive k(0, 01). In an identical manner, for example, the data covering the node 100 becomes ((10, 101), Enc[k(10, 101)](Kg)).

Regarding an MKB generated by means of a method other than the CS method and the SD method; the extracting unit 103 can be configured to extract, from the entire MKB and according to the configuration of the MKB, partial information that enables processing using the device keys of the communication devices 200 belonging to the multicast groups.

Returning to the explanation with reference to FIG. 2, when the group information is updated, the output unit 104 outputs output information that contains the group ID of an updated group, the identification information (such as the multicast group ID), and the partial information to the group (the multicast group) identified in the identification information. For example, by means of multicasting, the output unit 104 sends, as the output information, a group operation message to the multicast group that is identified by MG_ID specified in the group operation message. Thus, by allowing the output of the output unit 104 to also reach the communication devices 200 that are not to be subjected to a group change; it becomes possible to reduce, as compared to the opposite case, the computation cost that is necessary for the output unit 104 to determine the output destination.

Moreover, the output unit 104 can also be configured to send the abovementioned information to a multicast group to which belong the communication devices 200 that are included in a pre-updating group but are not included in the corresponding updated group. Although such communication devices 200 belong to a multicast group, they withdraw themselves from the updated group due to their incapability to process the partial information in a correct manner. In this way, using an MKB that has been divided in portions, it is possible to issue a command that instructs withdrawal from a group. By issuing such a command, it becomes possible to appropriately manage the information that the communication devices 200 need to hold.

Meanwhile, the command that instructs withdrawal from a group may not be issued to the communication devices 200 that are not included in the updated group. That is because the communication devices not included in the updated group cannot derive the updated group key in response to an updating command and cannot participate in the updated group. With such a configuration, there are cases when it becomes possible to reduce the data size of commands that the communication control device 100 needs to issue.

The output unit 104 outputs the output information to such a set (group) of communication devices 200 that includes the communication devices 200 which are managed independent of the target groups to be subjected to group operations using an MKB and that includes all the communication devices 200 for which at least the corresponding groups are updated. Herein, a set of communication devices 200 points to a collection of a plurality of communication devices 200 and is not necessarily consistent with the groups having group IDs assigned thereto. Examples of a set of communication devices 200 includes a set of communication devices 200 that receive data by means of a particular multicast communication; and includes a set of communication devices 200 that receive data by means of broadcast communication, that is, a set of all communication devices 200. For example, by means of one or more multicast communications or broadcast communications, the output unit 104 can output the output information to a set or a group of communication devices 200 that include lists of device IDs. In the case of sending the output information by means of multicast communication, the output unit 104 outputs the output information to, for example, one or more addresses (multicast addresses) corresponding to the target device IDs for distribution from among the addresses stored in the address storing unit 122.

In the example given above, the extracting unit 103 divides an MKB in portions on the basis of the multicast group IDs stored in the address storing unit 122. However, it is also possible to think of different operations for the extracting unit 103. For example, it is possible to think of an MKB division method in which partial information of an MKB is established from a previously-received MKB; the destination multicast group ID of the partial information is obtained for each set of the partial information of the MKB; and the destination multicast groups and the partial information of the MKB is sent to the output unit 104.

An example of that is given below. Herein, the MKB illustrated in FIG. 4 is written as {M1, M2}, where "M1" and "M2" are two mutually exclusive subsets of the MKB.

In FIG. 4, M1 ={(00, Enc[k(00)](Kg))} and M2 ={(100, Enc[k(100)](Kg)), (11, Enc[k(11)](Kg))} is illustrated. The operations performed by the extracting unit 103 are as follows.

```
for (m in [subsets of the MKB]){//m points to M1 or M2
    [the set of destinations of m]=φ;
    for (node-data in [the elements of m]){
        for (dev_id in [the device IDs covered by node-data]){
            search in the address storing unit 122 for the multicast
group ID corresponding to dev_id;//not empty
            id=the multicast group ID retrieved as mentioned above;
            add id to [the set of destinations of m];
        }
    }
    send m and [the set of destinations of m] to the output
unit 104;
}
```

Thus, for each element m belonging to the subsets of the MKB, the extracting unit 103 performs the following operations. Firstly, the extracting unit 103 initializes [the set of destinations of m] and, for every node-data included in the element m, obtains the device ID dev_id that is covered by node-data. Herein, every node-data represents the data that contains a ciphertext included in the MKB. In the present embodiment, node-data points to a ciphertext that is obtained by encrypting the group key using a node index and using the node key assigned to the node which is identified by that index. Then, the multicast group ID belonging to the obtained device ID dev_id is identified and set as "id". Subsequently, "id" is added to the [the set of destinations of m]. When the operations described above are performed with respect to every node-data included in the element m, the extracting unit 103 sends the element m and the [set of destinations of m] to the output unit 104.

Upon receiving each element m belonging to the subsets of the MKB and the corresponding [set of destinations of m] from the extracting unit 103, the output unit 104 performs multicast communication to sequentially send the elements m to the multicast groups that are the elements of [the set of destinations of m].

Figure 6:
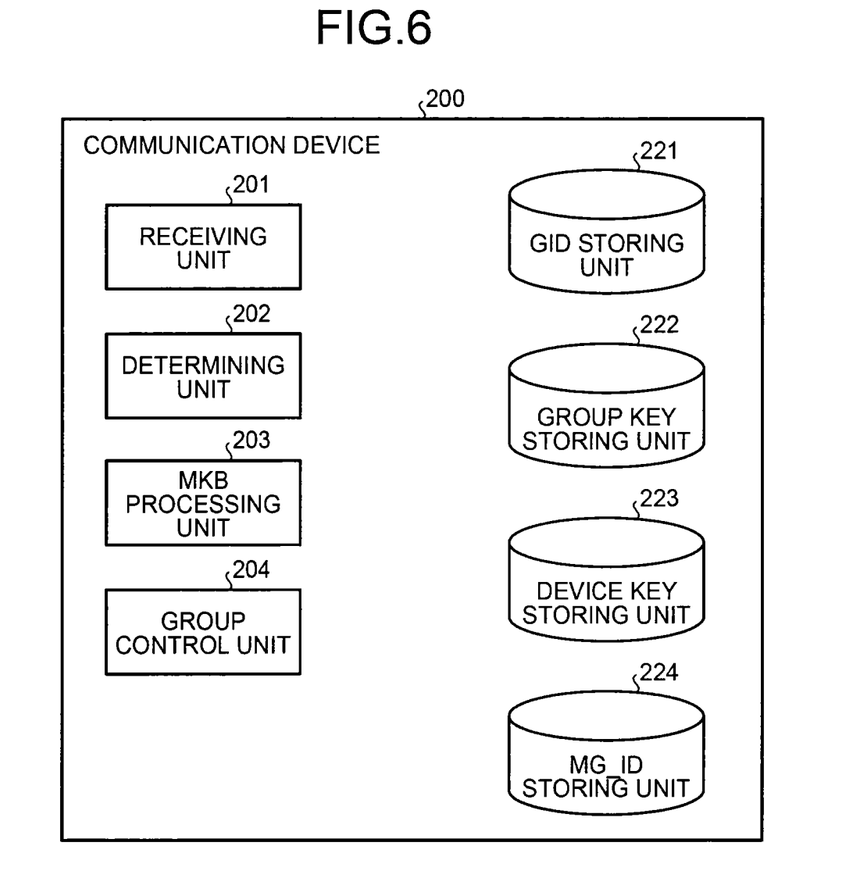
FIG. 6 is a block diagram illustrating a communication device according to the embodiment.

FIG. 6 is a block diagram illustrating a configuration example of the communication device 200. As illustrated in FIG. 6, the communication device 200 includes a GID storing unit 221, a group key storing unit 222, a device key storing unit 223, an MG_ID storing unit 224, a receiving unit 201, a determining unit 202, an MKB processing unit 203, and a group control unit 204.

The GID storing unit 221 is used to store the group ID (GID) of the group to which the communication device 200 belongs. The group key storing unit 222 is used to store the group key of the group that is identified by the group ID stored in the GID storing unit 221. The device key storing unit 223 is used to store the device key of the communication device 200. The MG_ID storing unit 224 is used to store the identification information (such as the multicast group ID) that enables identification of the multicast group to which the communication device 200 belongs.

The receiving unit 201 receives a variety of information from the communication control device 100 and from other external devices such as the other communication devices 200. For example, the receiving unit 201 receives a group operation message from the communication control device 100. Moreover, the receiving unit 201 receives output information by means of multicast communication and broadcast communication. The receiving unit 201 determines whether a received message is a group operation message. If the received message is not a group operation message, then the received message is sent to another module (not illustrated) for processing in which the message is supposed to be processed. On the other hand, if the received message is a group operation message, the data of the message is sent to the determining unit 202.

The determining unit 202 determines whether or not the identification information (MG_ID) specified in the group operation message matches with the identification information that is stored in the MG_ID storing unit 224. If the two pieces of identification information do not match, then the corresponding communication device 200 is not the target device for using the group operation message. As a result, the operations with respect to the group operation message are terminated. On the other hand, if the two pieces of identification information match, then the corresponding communication device 200 is the target device for using the group operation message. As a result, the group operation message is sent to the MKB processing unit 203.

When the determining unit 202 determines that the two pieces of identification information match, the MKB processing unit 203 performs MKB processing to generate a group key from the partial information (MKB_DATA) included in the group operation message and from the device key stored in the device key storing unit 223. If a group key is obtained as a result of MKB processing, it means that the corresponding communication device 200 belongs to the group that is identified by the GID. Then, the MKB processing unit 203 sends the GID and the group key to the group control unit 204.

The group control unit 204 stores the GID in the GID storing unit 221 and stores the group key in the group key storing unit 222. If a GID is already stored in the GID storing unit 221, then the group control unit 204 updates the stored GID with the GID specified in the group operation message.

On the other hand, if no group is obtained as a result of MKB processing, it means that the corresponding communication device 200 is not supposed to belong to the group that is identified by the GID. Hence, in case the communication device 200 is belonging to the group that is identified by the GID, then that communication device 200 needs to withdraw itself from that group. For that reason, the MKB processing unit 203 sends the GID and a notification of not being able to obtain the group key to the group control unit 204.

Then, the group control unit 204 empties the GID storing unit 221 and the group key storing unit 222. That is, if a GID or a group key is already stored, the group control unit 204 deletes it.

Meanwhile, each storing unit mentioned above can be configured with any type of a commonly-used memory medium such as an HDD (Hard Disk Drive), an optical disk, a memory card, or a RAM (Random Access Memory).

Moreover, the receiving unit 101, the MKB generating unit 102, the extracting unit 103, and the output unit 104 in the communication control device 100, as well as the receiving unit 201, the determining unit 202, the MKB processing unit 203, and the group control unit 204 in the communication device 200 can be implemented by executing programs in a processor such as a CPU (Central Processing Unit), that is, can be implemented using software; or can be implemented using hardware such as integrated circuits (ICs); or can be implemented using a combination of software and hardware.

Figure 7:
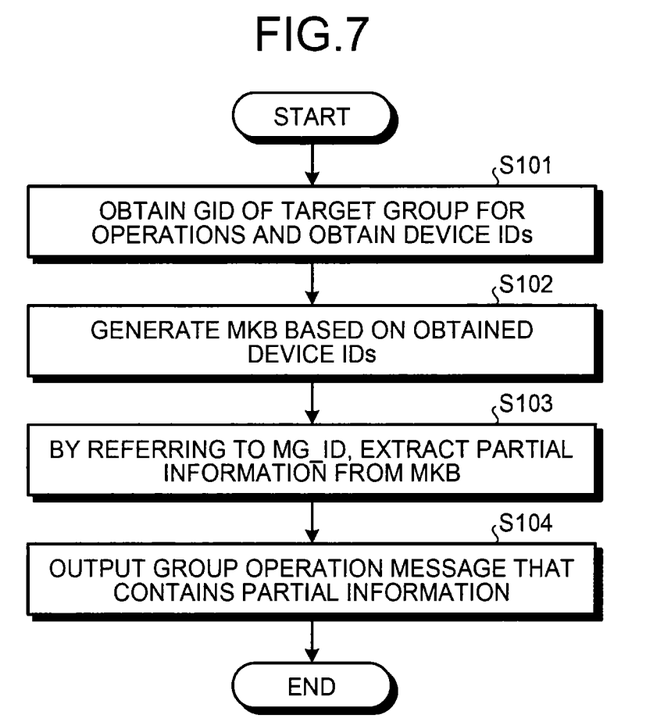
FIG. 7 is a flowchart for explaining an example of a communication control operation performed according to the present embodiment.

Explained below with reference to FIG. 7 is a communication control operation performed by the communication control device 100 according to the present embodiment.

FIG. 7 is a flowchart for explaining an example of the communication control operation performed according to the present embodiment.

The receiving unit 101 obtains (receives) the GID of the target group for operations and the device IDs of the communication devices 200 belonging to that group (Step S101). Then, the MKB generating unit 102 generates an MKB based on the obtained device IDs (Step S102). For example, the MKB generating unit 102 generates an MKB form which the communication devices 200 corresponding to the obtained device IDs can obtain a group key.

Subsequently, for each piece of identification information (MG_ID) that is stored in the address storing unit 122; the extracting unit 103 extracts, from the generated MKB, partial information that is processible by the device keys of the communication devices 200 that belong to the group (the multicast group) which is identified by MG_ID (Step S103). Then, the extracting unit 103 generates a group operation message containing the extracted partial information.

The output unit 104 outputs the group operation message (Step S104). Herein, the group operation message is generated for each MG_ID that is stored in the address storing unit 122. If the group operation message corresponding to a particular MG_ID is empty, then the group operation message is not output to the multicast group identified by that MG_ID. For that reason, at a maximum, the output unit 104 outputs the group operation messages equal in number to the number of MG_ID stored in the address storing unit 122.

Figure 8:
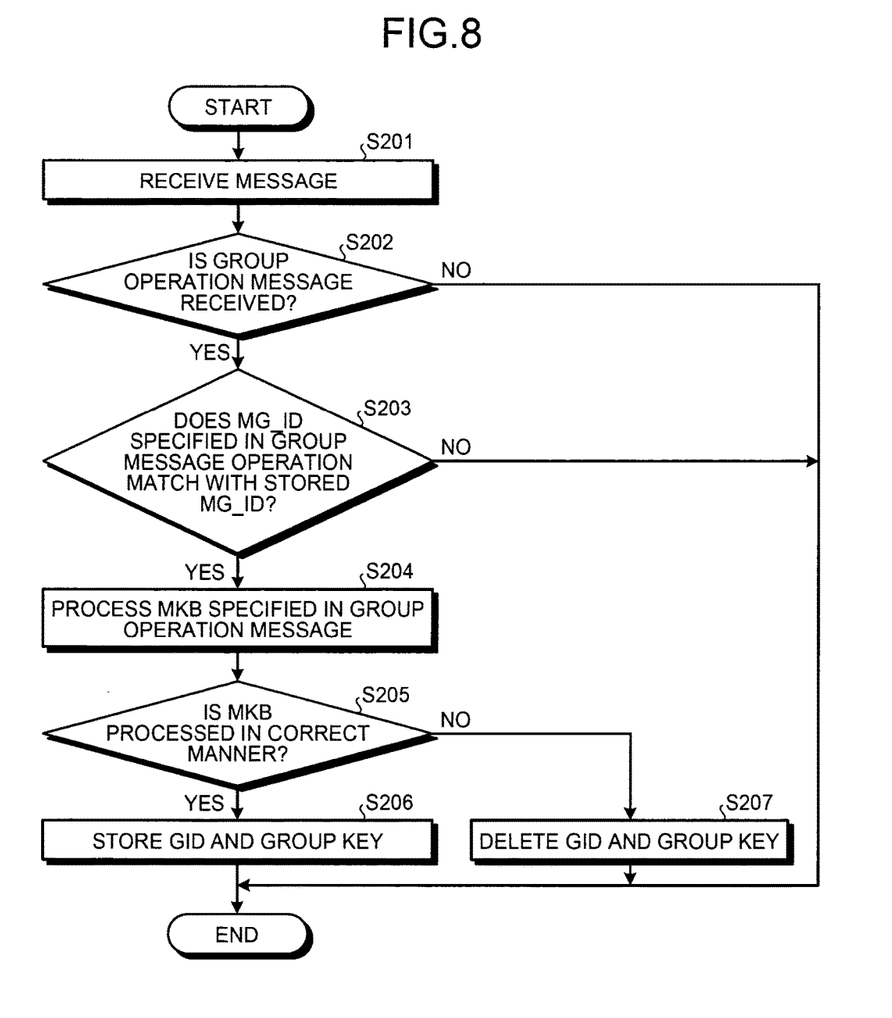
FIG. 8 is a flowchart for explaining an example of a group control operation performed according to the present embodiment.

Explained below with reference to FIG. 8 is a group control operation performed by the communication device 200 according to the present embodiment. FIG. 8 is a flowchart for explaining an example of the group control operation performed according to the present embodiment.

The receiving unit 201 receives a message from an external device such as the communication control device 100 (Step S201). Then, the receiving unit 201 determines whether or not the received message is a group operation message (Step S202). If the received message is not a group operation message (No at Step S202), then the group control operation is terminated. A message other than a group operation message is sent to another module in which the message is supposed to be processed, and is appropriately processed.

On the other hand, if the received message is a group operation message (Yes at Step S202), then the determining unit 202 determines whether or not MG_ID specified in the group operation message matches with one of MG_ID stored in the MG_ID storing unit 224 (Step S203).

If MG_ID specified in the group operation message does not match with one of MG_ID stored in the MG_ID storing unit 224 (No at Step S203); then the group control operation is terminated because the corresponding communication device 200 is not the target device for using the group operation message. On the other hand, if MG_ID specified in the group operation message matches with MG_ID that is stored in the MG_ID storing unit 224 (Yes at Step S203); then the MKB processing unit 203 processes the MKB (MKB_DATA) that is specified in the group operation message (Step S204).

Then, the MKB processing unit 203 determines whether or not the MKB was processed in a correct manner (Step S205). If the MKB was processed in a correct manner (Yes at Step S205); then the group control unit 204 stores the GID, which is specified in the group operation message, in the GID storing unit 221 and stores the group key, which is obtained as a result of MKB processing, in the group key storing unit 222 (Step S206). On the other hand, if the MKB was not processed in a correct manner (No at Step S205); then the group control unit 204 deletes the GID, which is specified in the group operation message, from the GID storing unit 221 and deletes the group key from the group key storing unit 222 (Step S207).

In this way, in the communication control device according to the present embodiment, it becomes possible to perform dynamic group management while ensuring scalability. Moreover, for the purpose of performing group management, only the partial information that is extracted from an MKB is sent instead of sending the entire MKB. Hence, it becomes possible to reduce the communication load. At that time, the partial information is sent along with the information used in setting the range of communication devices to be subjected to group operations. Hence, it becomes possible to avoid unintended group operations.

(First Modification)

According to the abovementioned embodiment, the extracting unit 103 extracts pieces of partial information each containing some elements of an MKB which covers the device IDs belonging to a multicast group, and sends the extracted partial information via the output unit 104. However, instead of sending the extracted partial information without modification; it is also possible to divide some elements of the MKB that are included in the partial information into portions equal to or smaller than a predetermined size, and to send each divided portion of partial information via the output unit 104. Alternatively, instead of performing divisions equal to or smaller than a predetermined size, the partial information sent to each multicast group can be divided so as to ensure that each set of partial information has the same size. Moreover, that predetermined size can be different for each multicast group. In this way, by reconfiguring the partial information, it becomes possible to send commands suitable for various conditions by taking into account the communication speed, the capability such as the volume of the temporary storage area in the communication devices 200, and the characteristics of the multicast groups.

(Second Modification Example)

According to the abovementioned embodiment, the extracting unit extracts, from an MKB, pieces of partial information each containing some elements of the MKB; obtains the multicast groups to each of which a piece of partial information is to be sent; and sends the partial information to those multicast groups. However, if one or more pieces of partial information are to be sent to a particular multicast group, then reconfiguration such as bundling those pieces of partial information together can be done and the bundled information can be sent via the output unit 104. Alternatively, in an identical manner to the first modification example, the partial information to be sent can be divided into portions equal to or smaller than a predetermined size. Alternatively, instead of performing divisions equal to or smaller than a predetermined size, the pieces of partial information to be sent to each multicast group can be divided so as to ensure that the partial information sent to each multicast group has the same size. Moreover, that predetermined size can be different for each multicast group. In this way, by reconfiguring the partial information, it becomes possible to send commands suitable for various conditions by taking into account the communication speed, the capability such as the volume of the temporary storage area in the communication devices 200, and the characteristics of the multicast groups.

Figure 9:
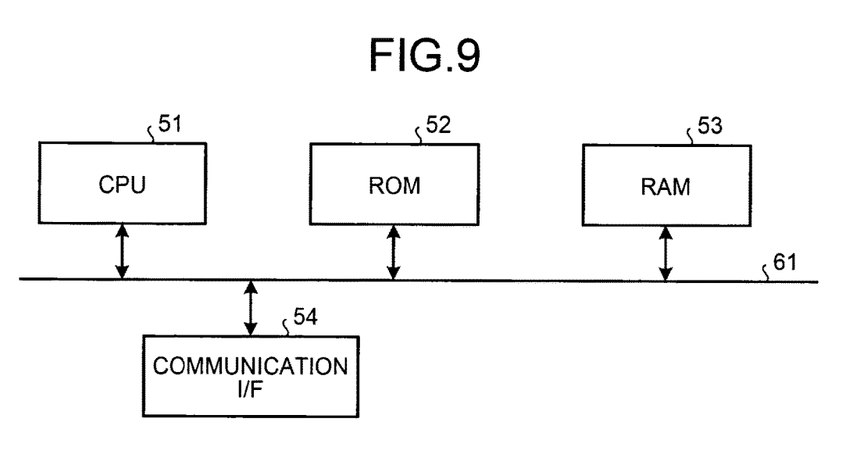
FIG. 9 is a hardware configuration diagram of the device according to the embodiment.

Explained below with reference to FIG. 9 is a hardware configuration of the communication control device according to the present embodiment. FIG. 9 is an explanatory diagram illustrating a hardware configuration of the communication control device according to the present embodiment.

The communication control device according to the present embodiment includes a control device such as a CPU (Central Processing Unit) 51; memory devices such as a ROM (Read Only Memory) 52 and a RAM (Random Access Memory) 53; a communication I/F 54 that performs communication by establishing connection with a network; and a bus 61 that interconnects the constituent elements.

The programs executed in the devices (the communication control device and the communication devices) according to the present embodiment are stored in advance in the ROM 52.

Alternatively, the programs executed in the devices according to the present embodiment can be recorded in the form of installable or executable files in a computer-readable recording medium such as a CD-ROM (compact disk read only memory), a flexible disk (FD), a CD-R (compact disk readable), or a DVD (digital versatile disk).

Still alternatively, the programs executed in the devices according to the present embodiment can be saved as downloadable files on a computer connected to the Internet or can be made available for distribution through a network such as the Internet.

The programs executed in the devices according to the present embodiment can make a computer function as the constituent elements mentioned above. In that computer, the CPU 51 can read the computer-readable programs from a memory medium and execute them after loading them in a main memory device.

While certain embodiments have been described, these embodiments have been presented by way of example only, and are not intended to limit the range of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the range and spirit of the inventions.

What is claimed is:

1. A communication control device that is connected to a plurality of communication devices, one or more of the communication devices belonging to a first-type group and one or more of the communication devices belonging to a second-type group, the communication control device comprising:
   a first memory that stores therein group identification information, which indicates a single second-type group from among a plurality of the second-type groups, in a corresponding manner to device IDs of the communication devices belonging to the second-type group; and
   one or more processors configured to:
   from a media key block containing a plurality of elements, extract partial information containing only part of the plurality of elements, the partial information being a ciphertext that is processible using a device key of each communication device belonging to the second-type group; and
   to the communication devices belonging to the second-type group that is identified by the group identification information corresponding to the partial information, output a group ID that indicates the first-type group, the group identification information, and the partial information.

2. The device according to claim 1, wherein the one or more processors are further configured to make use of device keys of the communication devices belong to the first-type group and generate a media key block from which a group key is derivable only by the communication devices belonging to the first-type group.

3. The device according to claim 1, further comprising a second memory that stores therein group information which contains a group ID that indicates the first-type group and which contains device IDs that indicate the communication devices belonging to the first-type group.

4. The device according to claim 1, further comprising a third memory that stores therein device keys of the communication devices in a corresponding manner to nodes included in a graph structure, wherein
   when the group information is updated, the one or more processors generate the media key block based on the device keys corresponding to the nodes that correspond to the communication devices belonging to the first-type group which has been updated, and
   for each piece of the group identification information, the one or more processors extract, from the media key block, the partial information that is processible using the device keys corresponding to the nodes that correspond to the communication devices belonging to the subset of the second-type group which is identified by the group identification information.

5. The device according to claim 4, wherein
   the graph structure is a tree structure, and
   leaf nodes of the tree structure correspond to the device IDs on a one-to-one basis.

6. The device according to claim 1, wherein
   the second-type group is a multicast group, and
   the group identification information that indicates the second-type group is information that indicates a multicast address corresponding to the multicast group.

7. The device according to claim 1, wherein
   with respect to one or more pieces of the partial information that are output to the second-type group, the one or more processors generate, from the one or more pieces of the partial information, second-type of partial information that contains elements equal in number to or smaller in number than a predetermined number, and
   the one or more processors output the group ID of the first-type group which has been updated, the second-type of partial information, and the group identification information, to the communication devices belonging to the second-type group that is identified by the group identification information corresponding to the partial information.

8. A computer program product comprising a non-transitory computer-readable medium containing a program that is implemented in a communication control device which is connected to a plurality of communication devices, one or more of the communication devices belonging to a first-type group and one or more of the communication devices belonging to a second-type group, the communication control device including a first memory that stores therein group identification information, which indicates a single second-type group from among a plurality of the second-type groups, in a corresponding manner to device IDs of the communication devices belonging to the second-type group, the program causing the communication control device to function as:

one or more processors configured to:
from a media key block containing a plurality of elements, extract partial information containing only part of the plurality of elements, the partial information being a ciphertext that is processible using a device key of each communication device belonging to the second-type group; and
to the communication devices belonging to the second-type group that is identified by the group identification information corresponding to the partial information, output a group ID that indicates the first-type group, the group identification information, and the partial information.

9. The device according to claim 1, wherein the second-type group is managed independently from the first-type group that is subjected to a group operation.

10. The device according to claim 1, wherein the partial information does not contain an element which is not processible by each communication device belonging to the subset of the second-type group.

* * * * *